United States Patent [19]

Schwefel

[11] Patent Number: 4,564,912

[45] Date of Patent: Jan. 14, 1986

[54] NUMERICAL CONTROL SYSTEM FOR DETERMINING TOOL WITHDRAWAL DIRECTION

[75] Inventor: Ernst Schwefel, Traunreut, Fed. Rep. of Germany

[73] Assignee: Dr. Johannes Heidenhain GmbH, Traunreut, Fed. Rep. of Germany

[21] Appl. No.: 762,801

[22] Filed: Aug. 2, 1985

Related U.S. Application Data

[63] Continuation of Ser. No. 471,439, Mar. 2, 1983, abandoned.

[30] Foreign Application Priority Data

Mar. 9, 1982 [DE] Fed. Rep. of Germany ....... 3208389

[51] Int. Cl.$^4$ ...................... G06F 15/46; G05B 19/18; B23K 9/16
[52] U.S. Cl. ................................... 364/474; 364/167; 219/69 G; 219/69 R
[58] Field of Search ........................ 364/167, 474, 513; 219/68, 69 R, 69 C, 69 G, 69 M; 901/41-42

[56] References Cited

U.S. PATENT DOCUMENTS

| | | | |
|---|---|---|---|
| 3,969,601 | 7/1976 | Rocklin | 219/69 G |
| 3,970,911 | 7/1976 | Schmall | 219/69 G X |
| 3,975,608 | 8/1976 | Ullmann et al. | 219/69 G X |
| 4,057,703 | 11/1977 | Pfau | 219/69 C |
| 4,071,729 | 1/1978 | Bell, Jr. | 219/69 C |
| 4,131,837 | 12/1978 | Whetham | 364/474 X |
| 4,185,184 | 1/1980 | Pfau | 219/69 G |
| 4,287,403 | 9/1981 | Sato et al. | 219/69 M |
| 4,321,451 | 3/1982 | Inoue | 219/69 G |
| 4,335,436 | 6/1982 | Inoue | 364/474 |
| 4,367,400 | 1/1983 | Otto et al. | 219/69 G |
| 4,448,342 | 5/1984 | Abe et al. | 364/513 X |

Primary Examiner—Gary V. Harkcom
Attorney, Agent, or Firm—Willian Brinks Olds Hofer Gilson & Lione Ltd.

[57] ABSTRACT

A control system for a processing machine such as an eroding machine operates to determine preferred withdrawal directions between a workpiece and a tool. In addition to the path movements necessary for the treatment process, the control system determines in advance at each point along the predetermined path a withdrawal direction oriented away from the surface being processed. This withdrawal direction runs essentially normal or perpendicular to the surface being processed on the workpiece. The amount of the desired separation between the tool and the workpiece along the withdrawal path is applied as an input to the control system in accordance with predetermined parameters of the treatment process.

13 Claims, 2 Drawing Figures

NUMERICAL CONTROL SYSTEM FOR DETERMINING TOOL WITHDRAWAL DIRECTION

This application is a continuation of application Ser. No. 471,439, filed Mar. 2, 1983, now abandoned.

BACKGROUND OF THE INVENTION

This invention relates to numerical control systems for processing machines such as eroding machines, in which the processing machine includes a tool and means for holding a workpiece, and in which the control system comprises means for positioning one of the holding means and the tool with respect to the other in at least two dimensions, as well as means for determining movements of the positioning means along a path adapted to accomplish a desired treatment process at a treated surface of the workpiece.

In eroding machines of the type described above, it has become customary to widen the contour formed by a cylindrical electrode in the workpiece for example by lowering the electrode into the workpiece along the direction of the cylinder axis of the electrode. This contour is widened by a so-called planetary movement (for example a circular movement between the workpiece and the tool in a plane perpendicular to the cylinder axis of the tool).

In the past, it has been common practice to control this planetary movement and the oscillations of the electrode with respect to the workpiece necessary for the erosion process in order to adjust the eroding gap between the electrode and the workpiece. One prior art approach is to use the three axis positioning system of the machine table which supports the workpiece in order to achieve the desired separation between the tool and the workpiece. This approach to controlling rapid oscillations is, however, unsatisfactory in many applications because of the relatively large mass and inertia of the machine table.

Furthermore, it is a known practice in eroding machines to control the planetary movement and the adjustment of the erosion gap by suitably positioning the electrode along three secondary axes. With this approach, however, a relatively large capital expenditure is required for the numerical control system.

SUMMARY OF THE INVENTION

The present invention is directed to an improved numerical control system of the general type described above which can be constructed for many applications at substantially reduced costs and which is adaptable to a wide variety of numerical control systems.

According to this invention, a numerical control system of the type described above is provided with first means for generating a separation signal indicative of a desired separation between the tool and the workpiece. In addition, second means are provided in the control system for automatically determining for each of a plurality of points along the processing path a respective withdrawal direction leading away from the treated surface of the workpiece. Third means are provided, responsive to the separation signal and the direction determining means, for causing a selected one of the holding means and tool to move along the respective withdrawal direction in response to the separation signal.

This invention provides the important advantage that it makes possible high speed processing of a workpiece and reduces wear on the processing tool. In that an appropriate withdrawal direction is determined automatically, the tool can readily, quickly and reliably be moved away from the treated surface of the workpiece when desired. Further features of the invention are set forth in the dependent claims.

The invention itself, together with further objects and attendant advantages, will best be understood by reference to the following detailed description taken in conjunction with the accompanying drawings.

DETAILED DESCRIPTION OF THE PRESENTLY PREFERRED EMBODIMENTS

Figure 1:
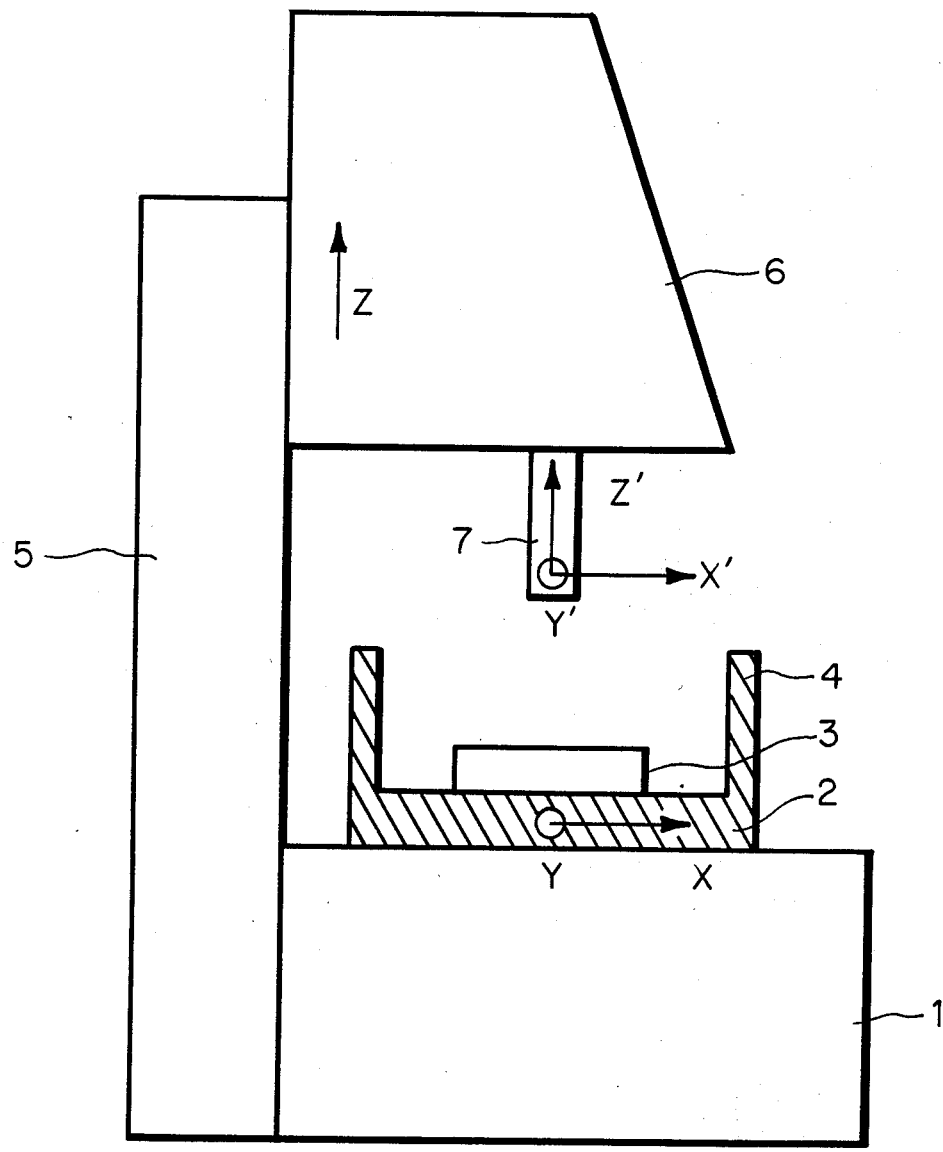
FIG. 1 is a simplified side view of an eroding machine which incorporates a presently preferred embodiment of this invention.

Turning now to the drawings, FIG. 1 shows a simplified representation of an eroding machine which includes a machine table 2 positioned on a bed 1. The machine table 2 is adapted to receive and hold a workpiece 3 to be processed, and the machine table 2 is slideable in the X and Y directions along the surface of the bed 1. The machine table 2 includes surrounding walls 4 adapted to receive and contain eroding fluid (not shown). The eroding machine of FIG. 1 also includes a stand 5 which is rigidly connected to the bed 1 and serves to support a carrier 6 for an erosion electrode 7. The carrier 6 is slideable in the Z direction on the stand 5. The electrode 7 is mounted on the carrier 6 such that the electrode 7 is slideable in the X', Y', and Z' directions.

Figure 2:
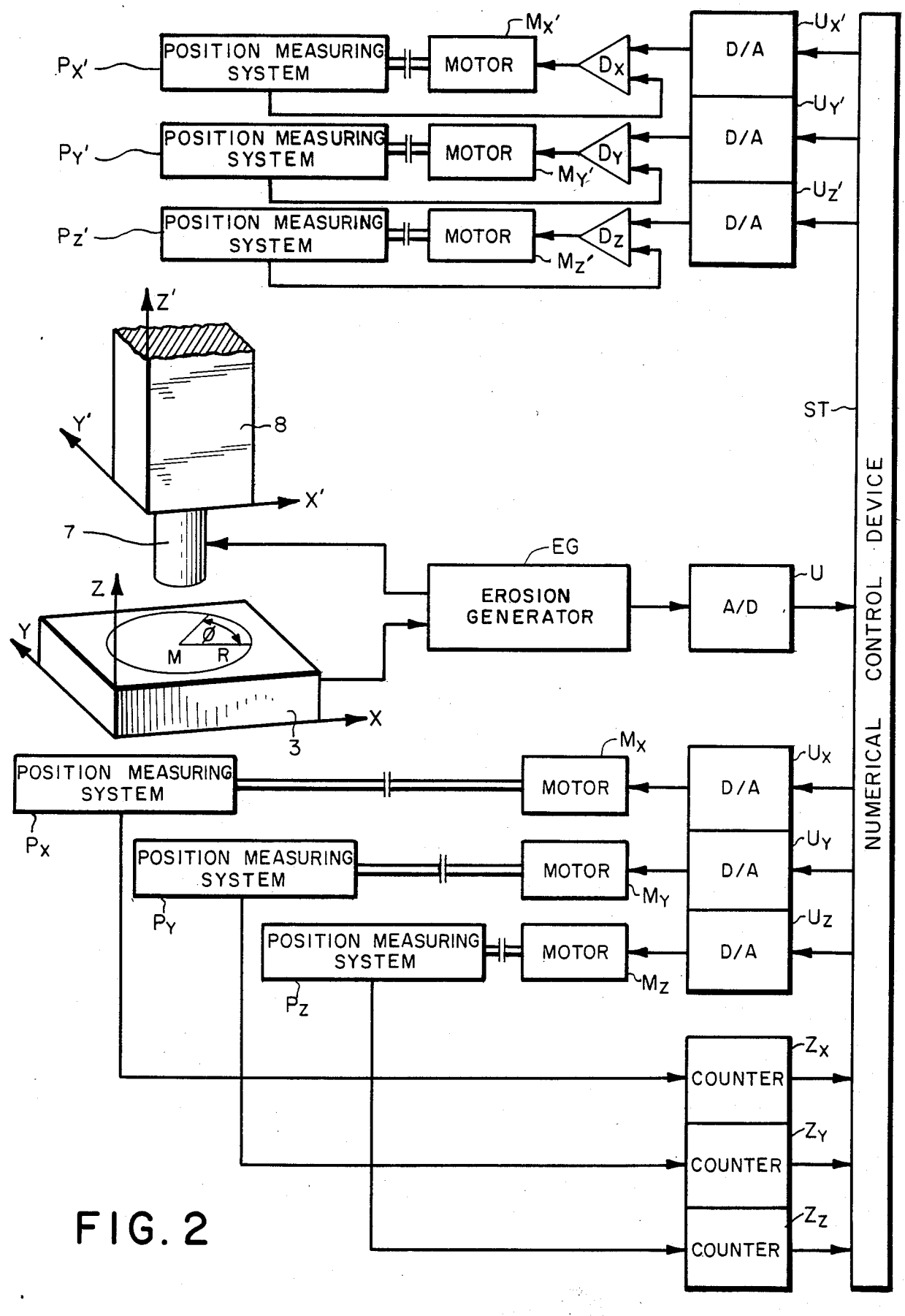
FIG. 2 is a block circuit diagram of the numerical control system of the eroding machine of FIG. 1.

FIG. 2 is a block diagram of the numerical control system which controls the operation of the eroding machine of FIG. 1 and incorporates the presently preferred embodiment of this invention. As shown in FIG. 2, this numerical control system includes a numerical control device ST which operates to position the machine table 2 and, therefore, the workpiece 3 by means of digital to analog converters $U_X$, $U_Y$, $U_Z$ which are coupled to servo motors $M_X$, $M_Y$, $M_Z$ in order to cause the machine table 2 to be moved along the X and Y axes and the carrier 6 to be moved along the Z axis. Three incremental positioning measuring instruments $P_X$, $P_Y$, $P_Z$ are mechanically coupled to respective ones of the motors $M_X$, $M_Y$, $M_Z$ and are adapted to measure the position of the workpiece 3 with respect to the carrier 6 in the X, Y and Z directions. The position measuring systems $P_X$, $P_Y$, $P_Z$ generate output measurement signals which are applied via counters $Z_X$, $Z_Y$, $Z_Z$ to the control device ST. The control device ST includes hardware and software which causes the machine table 2 and therefore the workpiece 3 to be moved in a planetary movement in the X and Y directions.

In order to position the electrode 7 or the electrode holder 8 with respect to the carrier 6, the control device ST is connected by means of analog to digital converters $U_{X'}$, $U_{Y'}$, $U_{Z'}$ and differential amplifiers $D_X$, $D_Y$, $D_Z$ with servo motors $M_{X'}$, $M_{Y'}$, $M_{Z'}$, respectively. These motors are mechanically coupled both to bring about the desired movement of the tool 7 and to respective ones of the position measuring device $P_{X'}$, $P_{Y'}$, $P_{Z'}$. These position measuring devices act to measure the position of the electrode 7 in the X', Y', and Z' directions with respect to the carrier 6. These position measuring devices $P_{X'}$, $P_{Y'}$, $P_{Z'}$ generate output measuring signals which are applied in each case as second inputs to respective ones of the differential amplifiers $D_X$, $D_Y$, $D_Z$.

In order to carry out the erosion process, the workpiece 3 and the electrode 7 are both electrically connected to an eroding generator EG. This eroding generator EG acts to generate a separation signal which is applied to an analog to digital converter U. This separation signal is an analog signal indicative of the desired separation between the electrode 7 and the workpiece 3. According to this invention, the control device ST determines in advance for the electrode 7 (in addition to the path movements necessary for the treatment process) for each predetermined path point a withdrawal direction leading away from the surface being processed or treated on the workpiece 3. As explained below, this withdrawal direction is used for the adjustment of the optimum separation between the electrode 7 and the workpiece 3. Preferably, the directional components of the withdrawal direction determined by the control device ST in the X, Y and Z directions are chosen such that the withdrawal direction is essentially normal or perpendicular to the surface of the workpiece 3 being processed at the moment. In each case, the withdrawal direction appropriate for the currently prevailing treatment surface of the workpiece 3 is determined from the prescribed momentary positions of the planetary movement.

The eroding gap or amount of the withdrawal path (i.e. the separation between the tool 7 and the workpiece 3 along the direction of the withdrawal path) is determined by the analog separation signal that is generated by the erosion generator EG in dependence on the currently prevailing parameters of the eroding process and is applied by means of the analog to digital converter U to the control device ST. Once the control device ST determines the desired components of the withdrawal path, these desired components are applied via the control device ST to the servo motors $M_{X'}$, $M_{Y'}$, $M_{Z'}$ in order to position electrode 7 in the X', Y', and Z' directions so as to adjust the width of the eroding gap properly. In the event of an electrical short circuit between electrode 7 and the workpiece 3, the separation signal generated by the erosion generator EG brings about an immediate lifting off of the electrode 7 from the treated surface of the workpiece 3. The components of the withdrawal (return) path can be conducted from the control device ST if desired through switching means to the servo motors $M_X$, $M_Y$, $M_Z$ in order to position the workpiece 3 to bring about the desired adjustment of the eroding gap. Preferably, the input of the analog separation signal into the control device ST takes place continuously.

Table I presents an exemplary flow chart of the manner in which the control device ST determines the withdrawal direction in the arrangement of FIG. 2. This arrangement provides planetary circular movement in the X, Y plane with a radius of motion R. In this embodiment, the control device ST generates withdrawal directions oriented toward the center of rotation M of the planetary circular movement. In this embodiment, the program of Table I is executed cyclicly, as for example as an interrupt routine which is executed every five minutes.

TABLE I
EXEMPLARY FLOW CHART

1. Entry.
2. Input separation signal S as a digital signal from A/D converter U.
3. Calculate new angle for circular movement:
   $\phi = \phi + \Delta\phi$.
4. Calculate local desired values of X and Y for circular movement:
   $X = X_M + R\cos\phi$;
   $Y = Y_M + R\sin\phi$.
5. Calculate control signals for D/A converters $U_X$ and $U_Y$:
   $V_X = Z_X - X$;
   $V_Y = Z_Y - Y$.
6. If S is greater than R, set S = R.
7. Calculate and output control signals for D/A converters $U_{X'}$ and $U_{Y'}$ of electrode positioning system:
   $V_{X'} = -S\cos\phi$;
   $V_{Y'} = -S\sin\phi$.
8. Return from interrupt.

After entry has been made to the program of Table I, the next step is to input the currently prevailing value of the separation signal S as a digital signal from the A/D converter U. As explained above, this separation signal S is a measure of the desired withdrawal path length, or separation between the electrode 7 and the workpiece 3. Next, a new angle $\phi$ for circular movement is calculated according to the equation $\phi = \phi + \Delta\phi$, where $\Delta\phi$ is a constant. FIG. 2 shows the correspondence between the angle $\phi$ and the workpiece 3. Next, the local desired values of X and Y for circular movement are calculated according to the equations of Step 4 of Table I. In this equation, the symbols X and Y designate coordinates along the X and Y axes, the symbols $X_M$, $Y_M$ designate the X and Y coordinates of the center of rotation M with respect to the X and Y coordinates and R and $\phi$ are as defined above. The next step is to calculate control signals for the D/A converters $U_X$, and $U_Y$ according to the formulas set out in Step 5 of Table I. In these equations $V_X$ and $V_Y$ designate the signals applied by the control device ST to the digital to analog converters $U_X$, $U_Y$ respectively and $Z_X$, $Z_Y$ correspond to the position signals maintained by the counters $Z_X$, $Z_Y$ respectively. Next, the separation signal S is set equal to the radius of circular movement R in the event S is greater than R. Then, output control signals for the D/A converters $U_{X'}$ and $U_{Y'}$ of the electrode positioning system are calculated and output according to the formulas set out in Step 7 of Table I. In these formulas, the symbols $V_{X'}$ and $V_{Y'}$ are used to designate the control signals to the digital to analog converters $U_{X'}$, $U_{Y'}$ respectively, and the symbols S and $\phi$ are used as described above. The program flow charted in Table I then returns from interrupt.

It should be apparent that the program of Table I operates automatically and repeatedly to determine a withdrawal direction which is oriented perpendicularly to the surface being treated by the tool 7. In this preferred embodiment, this withdrawal direction always extends between the surface being treated on the workpiece 3 and the center of symmetry M. In this way, if the erosion generator EG suddenly calls for an increase in the separation between the electrode 7 and the workpiece 3 by increasing the separation signal S, the appropriate withdrawal direction has already been determined, and the electrode 7 can rapidly, accurately and consistently be moved away from rather than toward, or in an oblique direction with respect to, the treated surface of the workpiece 3.

The present invention can be used in a wide variety of processing machines. If, for example, the present invention is used in conjunction with a milling machine, the separation signal can be generated by a pressure sensor as a function of the pressure exerted by the chip forming tool of the milling machine on the workpiece. For example, a piezoelectric element can be mounted to sense the pressure exerted by the milling tool on the workpiece. The control device can then be made responsive to the output signal of the sensor to bring about a reduction in the cutting depth of the milling tool in response to excessive loads on the milling tool. In this way, such excessive loads can be reduced.

Of course, it should be understood that a wide variety of changes and alterations can be made to the preferred embodiments described above. It is therefore intended that the foregoing detailed description be regarded as illustrative rather than limiting, and that it be understood that it is the following claims, including all equivalents, which are intended to define the scope of this invention.

I claim:

1. In a numerical control system for a processing machine; in which the processing machine comprises a tool, and means for holding a workpiece; and in which the control system comprises means for positioning one of the tool and the holding means with respect to the other of the tool and the holding means in at least two dimensions, and means for determining movements for the positioning means along a treatment path adapted to accomplish a desired treatment process at a treated surface of the workpiece; the improvement comprising:

first means for generating a separation signal indicative of a desired separation between the tool and the workpiece;

second means, included in the control system, for automatically determining in advance for each of a plurality of points along the path a respective withdrawal direction leading away from the treated surface of the workpiece, wherein at least some of the withdrawal directions are oriented nonparallel with respect to one another, wherein a plurality of said points are distributed along the length of the treatment path intermediate the ends of the treatment path, and wherein said plurality of points are arranged along the treatment path such that a respective one of the withdrawal directions is appropriate for each position of the tool with respect to the workpiece along the treatment path; and third means, responsive to the separation signal and the direction determining means, for causing a selected one of the tool and the holding means to move along the respective previously determined withdrawal direction in response to the separation signal in order to protect the workpiece and the tool from excessively low separation between the tool and the workpiece during the treatment process.

2. The improvement of claim 1 wherein at least a plurality of the withdrawal directions are oriented perpendicularly to the treated surface of the workpiece at a respective one of the points along the path.

3. The improvement of claim 1 wherein the treated surface defines a plurality of inner contours rotationally symmetrical about a center of symmetry, and wherein each of the withdrawal directions extends toward the center of symmetry.

4. The improvement of claim 1, wherein the third means is coupled to control the positioning means included in the processing machine.

5. The improvement of claim 4 wherein the third means comprises an auxiliary means for moving the selected one of the tool and the holding means, and wherein means are provided for selectively coupling the third means to a selected one of the auxiliary means and the positioning means.

6. The improvement of claim 4 wherein the third means applies an analog control signal to the positioning means to control the positioning means.

7. The improvement of claim 1 wherein the third means comprises an auxiliary means for moving the selected one of the tool and the holding means.

8. The improvement of claim 7 wherein the third means applies an analog control signal to the auxiliary means.

9. The improvement of claim 1 wherein the separation signal is an analog signal.

10. The improvement of claim 1 wherein the first means operates to generate the separation signal on a continuous basis.

11. The improvement of claim 1 wherein the first means comprises a sensor responsive to a selected parameter associated with interaction between the tool and the workpiece.

12. The improvement of claim 11 wherein the tool is adapted to remove chips from the workpiece and the sensor comprises means for measuring forces exerted between the tool and workpiece.

13. The improvement of claim 1 wherein the processing machine comprises an eroding machine which processes the workpiece by an erosion process, and wherein the first means is responsive to a parameter of the erosion process.

* * * * *